Figure 1:
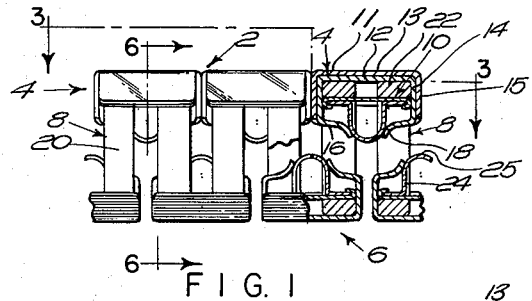

Dec. 1, 1964 K. A. RIETH 3,158,989
EXPANSIBLE LINKAGE
Filed Sept. 21, 1961 2 Sheets-Sheet 1

INVENTOR.
KURT ALBERT RIETH
BY
Dike, Thompson, Bronstein & Mrose
ATTORNEYS

Dec. 1, 1964 K. A. RIETH 3,158,989
EXPANSIBLE LINKAGE
Filed Sept. 21, 1961 2 Sheets-Sheet 2

INVENTOR.
KURT ALBERT RIETH
BY
*Dike, Thompson, Bronstein & Mrose*
ATTORNEYS

United States Patent Office 3,158,989
Patented Dec. 1, 1964

3,158,989
EXPANSIBLE LINKAGE
Kurt Albert Rieth, Warwick, R.I., assignor, by mesne assignments to Textron Inc., Providence, R.I., a corporation of Rhode Island
Filed Sept. 21, 1961, Ser. No. 139,735
12 Claims. (Cl. 59—79)

The present invention relates to expansible linkages of the type shown and described in U.S. Patent No. 2,689,450. Such linkages comprise upper and lower rows of staggered, overlapping hollow links which, when the linkage is in contracted position, are disposed generally transversely to the longitudinal center line of the linkage and connected together by U-shaped interconnecting members having legs extending in a direction generally transversely to the longitudinal center line of the linkage into adjacent links of adjacent rows so that each link in each row is connected to two adjacent links in the adjacent row. When the linkage is stretched longitudinally, the links are displaced relative to each other longitudinally of the linkage causing turning of the U-shaped members and their legs. A resilient means which is preferably a leaf spring, is associated with each link to resist turning of the legs during stretching of the linkage. The springs are biased between walls of the links and the legs and urge the legs against walls of the links. Preferably the portions of the legs which are between the springs and walls of the links are wider in the direction transverse to the direction in which they are urged by the springs than they are thick and when they turn they deflect the ends of the springs substantially. When the stretching force is released, the deflected springs return the linkage to contracted position by acting upon and turning the legs of the connecting members which act upon the walls of the links.

An object of the present invention is to provide a linkage which is generally of this type in which the resilient means comprises an integral part of the link and urges an insert member located within the link against portions of the link against portions of the legs of the interconnecting members, and the insert member in turn urges opposite portions of the legs against a wall or walls of the link.

In a preferred embodiment, the resilient means comprises a pair of spring fingers and the insert member has a protruding portion which is positioned between the spring fingers and the legs of the interconnecting members, the legs in turn being positioned between the insert member and a wall of the link. When the legs are turned during stretching of the linkage the protruding portion of the insert means is moved further between the spring fingers to thereby force the fingers apart against the spring force exerted thereby. When the stretching force is released, the fingers force the insert member to move back to its original contracted position to thereby force the legs to rotate to their original contracted positions, and the linkage to move to its contracted position.

Preferably, the outer portion of the protruding portion of the insert means is arcuate in cross sectional shape and the spring fingers converge toward each other. The spring fingers engage such arcuate portion at least in contracted position and in the preferred embodiment they engage it in both contracted and expanded positions. The curvature of the arcuate portion of the produding portion which is engaged by the spring fingers and the angles of convergence of the spring fingers are such that the force exerted on the protruding portion by the spring fingers at all times has a component in a direction to urge the insert means toward the legs in the link and the legs toward the opposite wall or walls of the link.

Preferably, the insert means comprises a member which the link opposite from the wall towards which the legs of the interconnecting members are urged, and the space between the spring fingers extends in a direction from side to side of the linkage, i.e. transverse to the longitudinal center line of the linkage.

In a preferred embodiment, the insert member also has a base portion which extends substantially across the internal width of the link in the direction of the longitudinal center line of the linkage.

Preferably, the inert means comprises a member which is generally U-shaped in cross section the central portion of the member being arcuate in cross section and forming the protruding portion of the insert member which is positioned between the spring fingers. This protruding portion of the insert member extends along the internal length of the link in or adjacent to the space between the fingers and has a plate or base extending across the opening of the U opposite to the arcuate protruding portion. This base engages the legs of the interconnecting members and extends across the internal width of the link in the direction of the longitudinal center line of the linkage.

Further objects and advantages of the invention will be apparent from the following description and the accompanying drawings which describe and show for illustrative purposes only, one embodiment of the invention.

Figure 2:
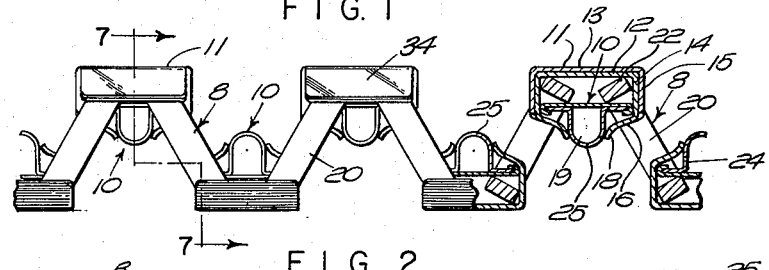
Figure 3:
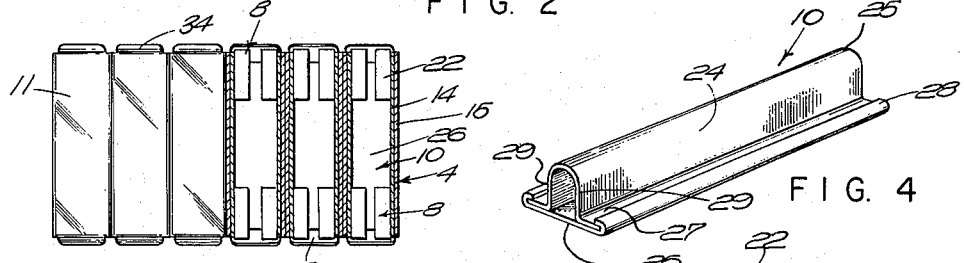
Figure 4:
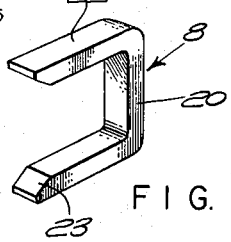
Figure 5:
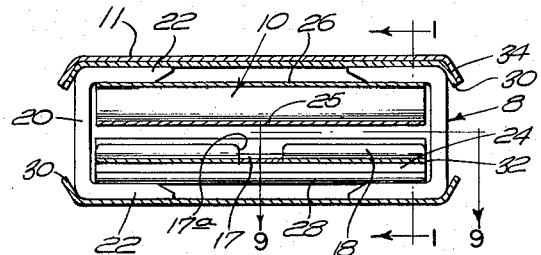
Figure 6:
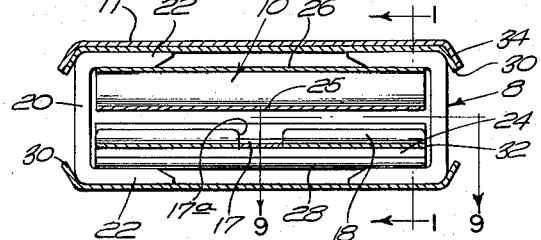
Figure 7:
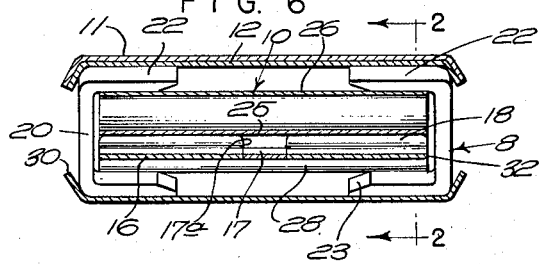
Figure 8:
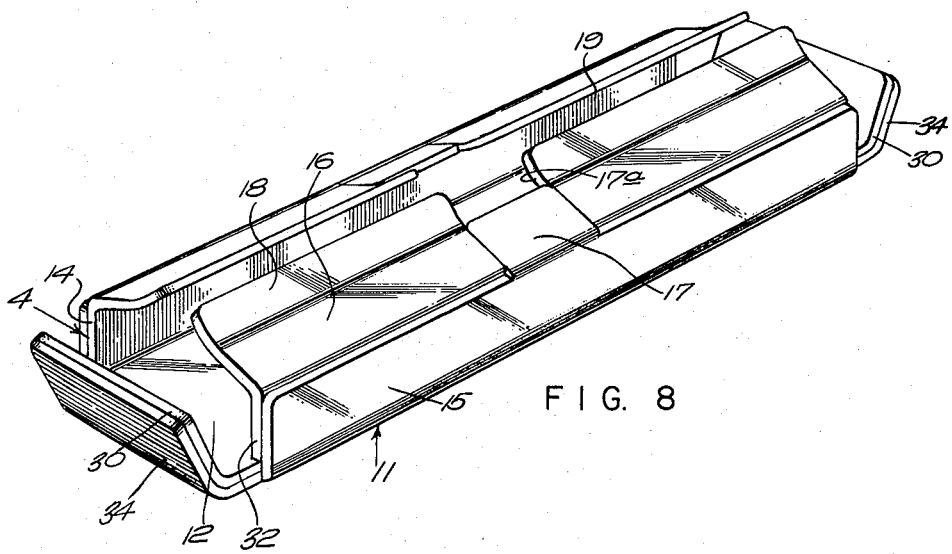
Figure 9:
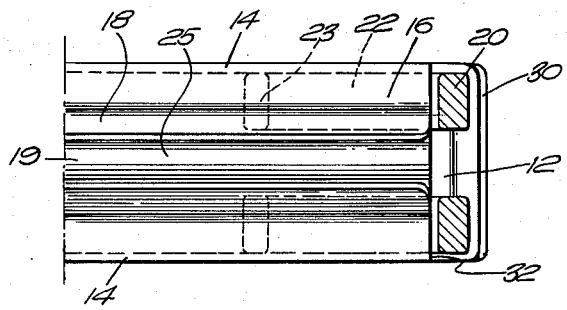

In the drawings:
FIG. 1 is a side view of a segment of a linkage embodying the present invention with the parts shown in contracted position and partly in section, the section being taken on the line 1—1 of FIG. 6.
FIG. 2 is a view like FIG. 1 but with the parts shown in an expanded position; the section being taken on the line 2—2 of FIG. 7.
FIG. 3 is a plan view of a segment of the linkage with the parts shown in contracted position and partly in section, the section being taken on the line 3—3 of FIG. 1.
FIG. 4 is a view in perspective of the insert member, which is located within the links.
FIG. 5 is a view in perspective of one of the U-shaped connecting members.
FIG. 6 is an enlarged section taken on the line 6—6 of FIG. 1.
FIG. 7 is an enlarged section taken on the line 7—7 of FIG. 2.
FIG. 8 is a view in perspective of one of the top links, turned upside down so as to shown the spring fingers on the bottom thereof.
FIG. 9 is a section taken along the line 9—9 of FIG. 6.

With reference to the drawings, 2 represents a linkage embodying the present invention and comprising a row of top links 4 and a row of bottom links 6 connected by U-shaped interconnecting members 8 and an insert member 10 within each of the top and bottom links. Each top link 4 has an ornamental top shell 11 attached thereto by the tabs 17 (FIG. 8).

The links 4 of the top row are staggered with relation to and overlap the bottom links 6 longitudinally of the linkage. The links of both rows are disposed transversely to the longitudinal center line of the linkage when contracted and viewed from the top, or shown in FIG. 3.

The top and bottom links 4 and 6 have substantially the same construction and are made of spring steel. Each link comprises an outer wall 12, which is a top wall, in the case of the top links and a bottom wall in the case of the bottom links, and a pair of opposite side walls 14 attached thereto. The inwardly extending flanges on the side walls taper or converge inwardly towards each other at 16 and 18. This forms a pair of spring fingers 16–18 on each link which converge toward each other, the space 19 between the spring fingers extending in a direction from side to side of the link transverse to the longitudinal center line of the linkage.

On the top links only the center portions of each of the wall portions 16 and the spring fingers 18 extending therefrom are notched at 17a.

The ornamental top shell 11 is secured to each top link 4. It has a top wall 13 overlying the top wall of the link and depending side walls 15 extending along and outside of the side walls of the top link. The center portions of the lower edges of the side walls 15 of the top shell 11 extend into tabs 17 which are bent inwardly into the notches 17a in the walls 16 of the top link to secure the shell 11 to the top link without interfering with flexing of the spring fingers 18.

The bottom links 6 are not provided with ornamental shells.

The ornamental shells may be omitted from the top links without departing from this invention.

Each link of each row is connected with the two adjacent links of the adjacent row by means of four U-shaped connecting members 8, each having legs 22 connected by a web 20. The legs 22 of the connecting members extend within the links in a direction generally transverse to the longitudinal center line of the linkage as shown in FIG. 3. The legs of two of the four U-shaped members extend within a link of one row near one side thereof, the other leg of one of such connecting members extends within an adjacent link in the other row and the other leg of the other connecting member extends within an adjacent link in said other row. The other two connecting members are located near the opposite side of the linkage and they extend within the links near said opposite side in the same way. The legs 22 of the connecting members are of greater width than thickness and their ends are beveled at 23 for ease in assembly.

The insert member 10 comprises a projection portion 24, the outer part 25 of which is arcuate in cross section. This may also be described as generally U-shaped in cross section. The ends of the sides 29 of member 24 extend outwardly into flanges 27 to which a flat base of plate 26 is secured by means of lips 28 turned in over the flanges 27. The plate 26 extends across or bridges the central opening of the protruding portion 24 to close it. The side edges of lips 28 slidably engage the side walls 14 of the link and the end edges of the insert member 10 lie closely adjacent to the webs 20 of the U-shaped interconnecting members 8.

An insert member 10 is located within each link, the outer part 25 of the protruding portion is positioned between the spring fingers 18 of the link and the four legs 22 within the link, such legs being positioned between the wall 12 of the link and the insert member.

The insert member is so dimensioned and located with respect to the spring fingers 18 that the arcuate portion 25 is positioned between the spring fingers 18 to keep the fingers under tension when the linkage is in retracted position, as shown in FIG. 1, the curvature of such arcuate portion and the converging slope of the tapered fingers 18 being such that the spring force exerted on the insert member by engagement of the fingers with the arcuate portion 25 has a component urging the insert member toward the legs of the U-shaped connected members and the wall 12 of the link, to thereby urge the plate 26 of the insert member into engagement with the legs 22 and the legs 22 into engagement with the wall 12 with the greater width of the legs thereof extending in a direction generally transverse to the direction in which the legs are urged.

Stretching of the linkage displaces the links longitudinally with respect to each other to thereby rotate the U-shaped connecting members and cause their legs 22 to turn within the links. Because of the greater width of the legs 22 the insert member 10 is pried away from the wall 12 rapidly by engagement of such legs with plate 26 and the wall 12 as the legs are turned to thereby move the arcuate portion 25 of the insert member further between the spring fingers 18. Thus an increasingly wider part of the arcuate portion 25 is forced into engagement with the fingers to thereby force the fingers further apart against the spring force exerted thereby, as shown in FIG. 2. Movement of the insert in one direction is limited by engagement of the plate 26 with the portions of the walls 16 which are adjacent to the side walls 14 of the link. Preferably, the parts are so dimensioned that at this "bottomed out" position of the insert plate 26, the fingers 18 still engage the arcuate portion 25 of the insert and the increased spring force still has a component in a direction urging the insert toward the legs 22 and wall 12, thus when the stretching force is released, the spring fingers 18 force the insert member 10 and hence the legs 22 of the U-shaped connected members to return to the positions shown in FIG. 1 to thereby force the linkage to contracted position.

The insert member 10 in each link extends substantially throughout the inner length of the link and the plate 26 engages all of the legs in the link to urge them against the wall 12. The width of the plate 26 in the direction of the longitudinal center line of the linkage is about the same as the inner dimension of the link in such direction to thereby cooperate with the spring fingers 18 to prevent movement of the insert longitudinally of the linkage.

The U-shaped connecting members 8 and insert members 10 are retained within the links by tabs 30 extending from the opposite sides of each outer wall 12 and bent over the webs 20 of the U-shaped connecting members. The bent tabs 30 are spaced sufficiently from the side edges 32 of the side walls to permit the webs 20 to rotate freely therebetween. The ornamental shells 11 also have tabs 34 bent over tabs 30.

Although the protruding portion 25 is arcuate in cross section in the embodiment shown in the drawings, it may be in the form of a tapered portion having straight side walls coming together at an apex. Also, a plurality of insert members per link can be used instead of a single one, for example one at each side of each link.

Although the spring fingers are shown as being integral with the remainder of the link structure, they may form part of a separate piece from the rest of the link.

The term "insert member," as used in the appended claims, includes a plurality of separate members which are operatively connected together as well as a one piece member.

While I have shown and described one desirable embodiment of the invention, it is to be understood that this disclosure is for the purpose of illustration and that various changes in shape, proportion and arrangement of parts as well as the substitution of equivalent elements for those herein shown and described, may be made without departing from the spirit and scope of the invention as set forth in the appended claims.

I claim:

1. In an expansible linkage having two rows of overlapping, staggered links, each link being disposed generally transversely to the longitudinal center line of the linkage when in contracted position and viewed from the top and means interconnecting the links of each row with the links of the other row to provide displacement of the links relative to each other longitudinally of the linkage when the linkage is stretched longitudinally from contracted to expanded position, said interconnecting means including an interconnecting member having a leg extending within at least one of said links in at least one of said rows of links in a direction generally transverse to the longitudinal center line of the linkage and having means spaced from said leg for rotatably connecting the interconnecting member to an adjacent link in the other row of links, whereby when said linkage is stretched, said one link and said adjacent link are displaced relative to each other longitudinally of the linkage and said leg is rotated relative to the walls of said one link, and resilient means associated with said one link for resisting said rotation and hence said displacement of said links, the improvement comprising an insert member within said one link, said resilient means comprising part of said one link and resiliently contacting and urging said insert member against said leg to urge said leg against a wall of said one link in a direction generally transverse to the axis of the leg, a portion of said leg located between said insert member and said wall of said one link including means for occupying an increasingly greater distance between said insert member and said wall of said one link against the force of said resilient means as said leg is rotated during movement of said one link and said adjacent link from their contracted toward their expanded positions, whereby said resilient means, insert member and means for occupying an increasingly greater distance cooperate to urge the linkage from an expanded toward a contracted position.

2. A linkage according to claim 1, said resilient means comprising a spring finger extending from a wall of said one link.

3. A linkage according to claim 1, said resilient means comprising a pair of spring fingers and said insert member having a portion of decreasing width positioned between said spring fingers, said spring fingers engaging said portion of decreasing width to urge said insert member against said leg to thereby urge said leg against said wall.

4. A linkage according to claim 3, said spring fingers converging toward each other, said rotation of said leg caused by said stretching of said linkage to thereby cause said leg to occupy said increasingly greater distance, urging said portion of said insert member further between said fingers to thereby force an increasingly wider part of said portion in the converging direction of said fingers to thereby force said spring fingers further part against the spring force exerted thereby, whereby when the stretching force is released, said spring fingers force said insert member to move in an opposite direction to thereby force said leg to rotate back to its contracted position.

5. A linkage according to claim 4, the surface of said portion of decreasing width being arcuate in cross section, and said spring fingers engaging said arcuate portion at least in the contracted position of said links.

6. A linkage according to claim 5, said insert member comprising a member which is generally U-shaped in cross section, the central portion of the member being arcuate in cross section and forming said portion of decreasing width, the opposite side of the insert member having a connecting member engaging portion for engaging said leg, and said spring fingers comprising wall portions of said one link opposite from said wall against which said leg is urged.

7. A linkage according to claim 6, the space between said spring fingers extending in a direction transverse to the longitudinal center line of said linkage, said connecting member engaging portion extending substantially across the internal dimension of said one link in a direction parallel to said longitudinal center line, and said insert member extending substantially across the internal length of said one link in a direction transverse to said longitudinal center line.

8. A linkage according to claim 1, said portion of said leg being of greater width than thickness, said greater width extending generally longitudinally of the linkage when the linkage is in contracted position.

9. In an expansible linkage comprising spaced rows of links, the rows of links being disposed generally transversely to the longitudinal center line of the linkage when contracted and viewed from the top, one row of links being arranged above the adjacent row of links, the links of one row being staggered and overlapping with respect to the links of the adjacent row, means interconnecting each of the links of one row with two adjacent links of the adjacent row, said interconnecting means comprising a pair of U-shaped members, one leg of each U-shaped member extending in a direction generally transverse to the longitudinal center line of the linkage within a link in one row near one side thereof and the other leg extending in substanttially the same direction within an adjacent link in the other row near the corresponding sides of the linkage, a second pair of U-shaped members, one leg of each of said second pair of U-shaped members extending within said link in said one row near the opposite side thereof and the other leg extending within said ajacent link in the adjacent row near the corresponding side of the linkage, whereby each link of one row is connected with two adjacent links in the adjacent row and when the linkage is stretched longitudinally from contracted towards expanded position, the links of each row are displaced relative to each other longitudinally of the linkage and said U-shaped members are rotated and turning movement of said legs within said links results, each of said legs having a portion of greater width than thickness, and resilient means associated with each link for resisting turning movement of said portions of said legs, the improvement comprising insert means within each of said links, said resilient means comprising part of its associated link and resiliently contacting and urging said insert means against said portions of said legs within said associated link to urge said portions of said legs against a wall of said associated link in a direction generally transverse to the axes of the legs, said U-shaped members when the linkage is contracted being positioned with the greater widths of their legs lying in a direction generally transverse to the direction in which the legs are urged by the resilient means, whereby said turning movement of said legs is opposed by said resilient means and said linkage is urged towards a contracted position.

10. A linkage according to claim 9, said resilient means comprising a pair of spring fingers and said insert means having a portion of decreasing width positioned between said spring fingers, said spring fingers engaging said portion of decreasing width to urge said insert means against said legs to thereby urge said legs against said wall.

11. In an expansible linkage comprising spaced rows of links, the links being disposed generally transversely to the longitudinal center line of the linkage when contracted and viewed from the top, one row of links being arranged above the adjacent row of links, the links of one row being staggered and overlapping with respect to the links of the adjacent row, means interconnecting each of the links of one row with two adjacent links of the adjacent row, said interconnecting means comprising two pairs of U-shaped members, one pair near one side of the linkage and the other pair near the opposite side of the linkage, one leg of each U-shaped member extending within a link in one row in a direction generally transverse to the longitudinal center line of the linkage and the other leg extending in substantially the same direction within an adjacent link in an adjacent row, whereby each link of one row is connected with two adjacent links in the adjacent row and when the linkage is stretched longitudinally from a contracted towards an expanded position the links of each row are displaced longitudinally, said U-shaped members are rotated and turning movements of said legs within said links results, each of said legs having a portion of greater width than thickness, and resilient means associated with each of said links for resisting the turning movements of said legs when the linkage is stretched longitudinally, said resilent means comprising at least a pair of spring fingers formed from portions of the link with which said resilient means is associated, each pair of spring fingers having their adjacent sides spaced apart lengthwise of the linkage, said spring fingers urging said portions of said legs within said link against a wall of said link in a direction generally transverse to the axes of the legs, said U-shaped members when the linkage is contracted, being positioned with the greater widths of their legs lying in a direction generally transverse to the direction in which the legs are urged by the resilient means whereby the turning movement of the legs which results from rotation of the U-shaped members during expansion of the linkage is opposed by said resilient means and said linkage is urged towards a contracted position.

12. In an expansible linkage comprising spaced rows of links, the links being disposed generally transversely to the longitudinal center line of the linkage when contracted and viewed from the top, one row of links being arranged above the adjacent row of links, the links of one row being staggered and overlapping with respect to the links of the adjacent row, means interconnecting each of the links of one row with two adjacent links of the adjacent row, said interconnecting means comprising a pair of U-shaped members, one leg of each U-shaped member extending in a direction generally transverse to the longitudinal center line of the linkage within a link in one row near one side thereof and the other leg extending in substantially the same direction within an adjacent link in the other row near the corresponding side of the linkage, a second pair of U-shaped members, one leg of each of said second pair of U-shaped members extending within said link in said one row near the opposite side thereof and the other leg extending within said adjacent link in the adjacent row near the corresponding side of the linkage, whereby each link of one row is connected with two adjacent links in the adjacent row and when the linkage is stretched longitudinally from contracted position towards expanded position, the links of each row are displaced relative to each other longitudinally of the linkage and said U-shaped members are rotated and turning movement of said legs within said links results, each of said legs having a portion of gerater width than thickness, and resilient means associated with each link for resisting turning movement of said legs, said resilient means comprising at least a pair of spring fingers which are integral with the link with which they are associated, and being arranged with their adjacent sides spaced apart lengthwise of the linkage, said spring fingers urging said portions of said legs within said link against a wall of said link in a direction generally transverse to the axes of the legs, said U-shaped members when the linkage is contracted being positioned with the greater widths of their legs lying in a direction generally transverse to the direction in which the legs are urged by the resilient means, whereby said turning movement of said legs during expansion of the linkage is opposed by said resilient means and said linkage is urged towards a contracted position.

References Cited in the file of this patent
UNITED STATES PATENTS

| | | |
|---|---|---|
| 881,925 | Holbrook | Mar. 17, 1908 |
| 2,941,351 | Dolansky | June 21, 1960 |

FOREIGN PATENTS

| | | |
|---|---|---|
| 215,243 | Australia | May 21, 1958 |